United States Patent

[11] 3,547,000

[72] Inventors Erich J. Haberkorn
Riemerling;
Hans W. Breuer, Munich, Germany
[21] Appl. No. 707,887
[22] Filed Feb. 20, 1968
[45] Patented Dec. 15, 1970
[73] Assignee Entwicklungsring Sud G.m.b.H.
Munich, Germany
[32] Priority Feb. 27, 1967; May 24, 1967
[33] Germany
[31] Nos. E33480 and E34048

[54] SYSTEM FOR DROPPING STORED MATERIAL FROM TUBULAR CONTAINER MEANS PROVIDED AT AN AIRCRAFT
13 Claims, 15 Drawing Figs.

[52] U.S. Cl. .................................................. 89/1.5, 244/136
[51] Int. Cl. .................................................. B64d 1/04
[50] Field of Search .......................................... 89/1.5, 1.7, 1.8; 244/136, 137

[56] References Cited
UNITED STATES PATENTS
2,381,332   8/1945   Boldt .......................... 89/1.5
2,723,093  11/1955   Price et al. .................... 244/137
2,979,991   4/1961   Buschers et al. ................ 89/1.7
3,018,691   1/1962   Merkin ......................... 89/1.5

*Primary Examiner*—Samuel W. Engle
*Attorney*—Kemon, Palmer, Stewart and Estabrook ABSTRACT: The invention concerns a system for storing material in tubular compartments which are provided in a container supported at an aircraft and for dropping the stored material therefrom. The tubular compartments comprise front and rear orifices with the front orifices being coupled to a pressure air generator to supply pressure air for pushing the stored material through the rear orifices. The pressure air generator comprises means for controlling the quantity and duration of pressure air supply for discharging the stored material. Behind the rear orifices a further pressure air output is provided for discharging an air flow which directs the stored material away from the aircraft after it has been pushed through the rear orifices of the tubular compartments. The tubular compartments are superposed within the container with their longitudinal axes being positioned preferably parallel to the roll axis of the aircraft.

PATENTED DEC 15 1970

INVENTOR.
Erich J. Habekorn
Hans W. Breuer
BY
Kenyon Palmer Stewart & Estabrook
Attorneys

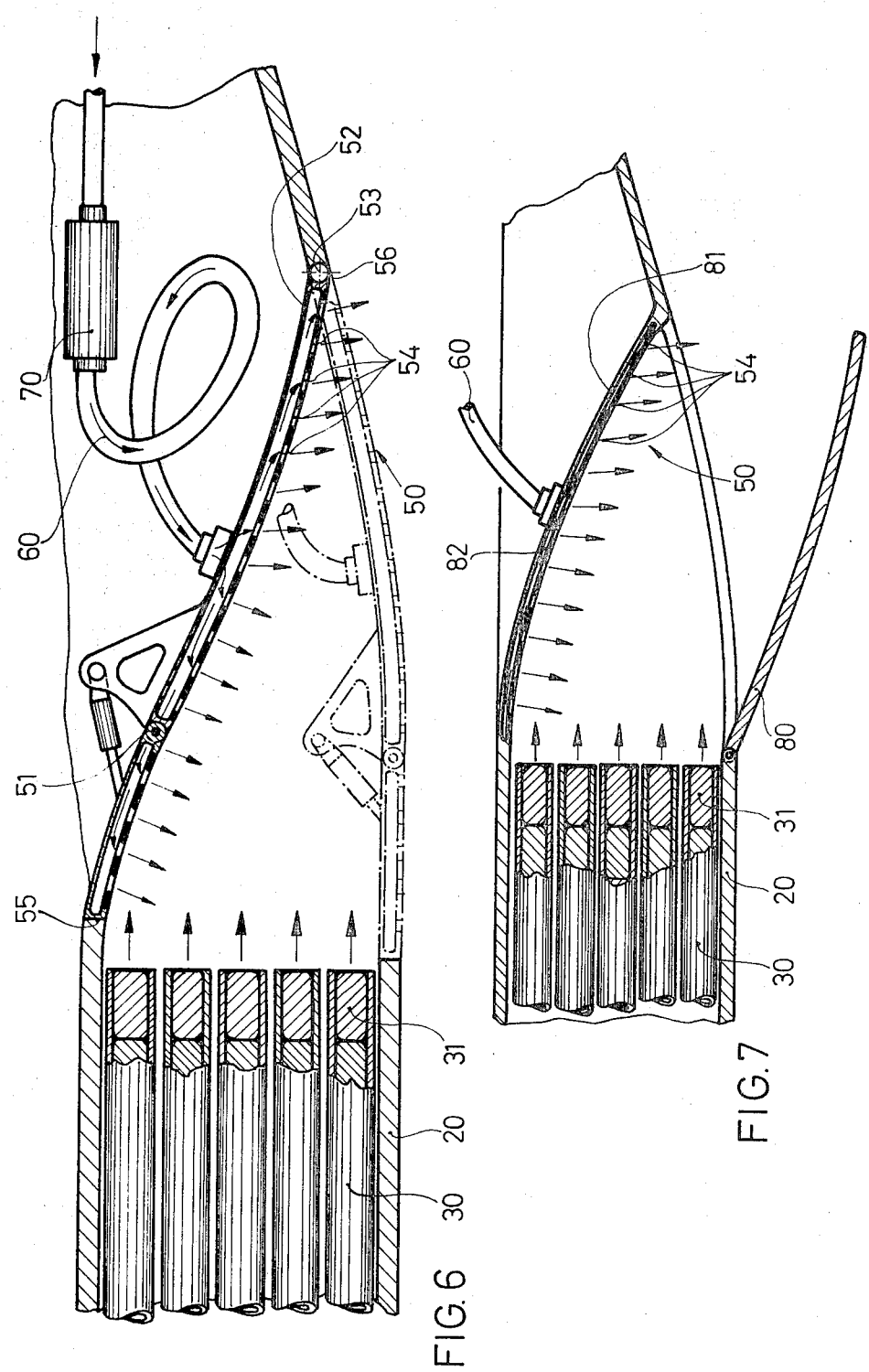

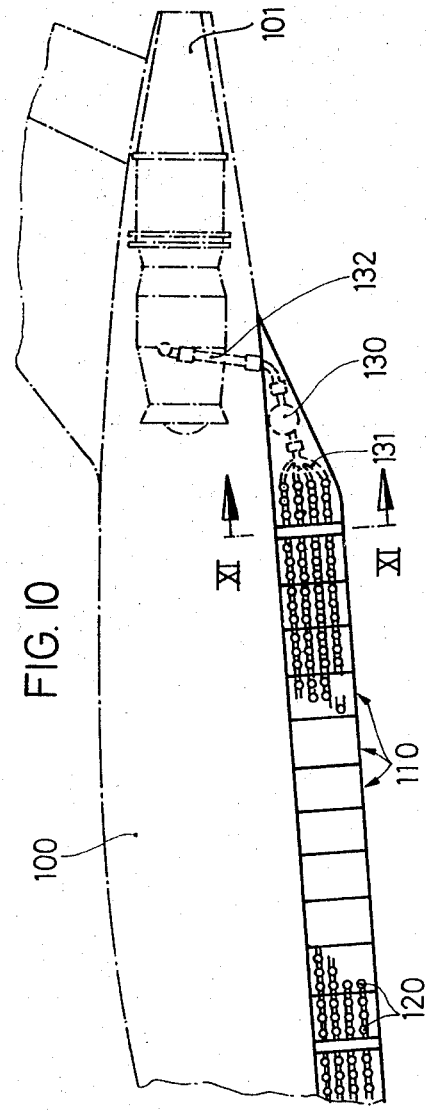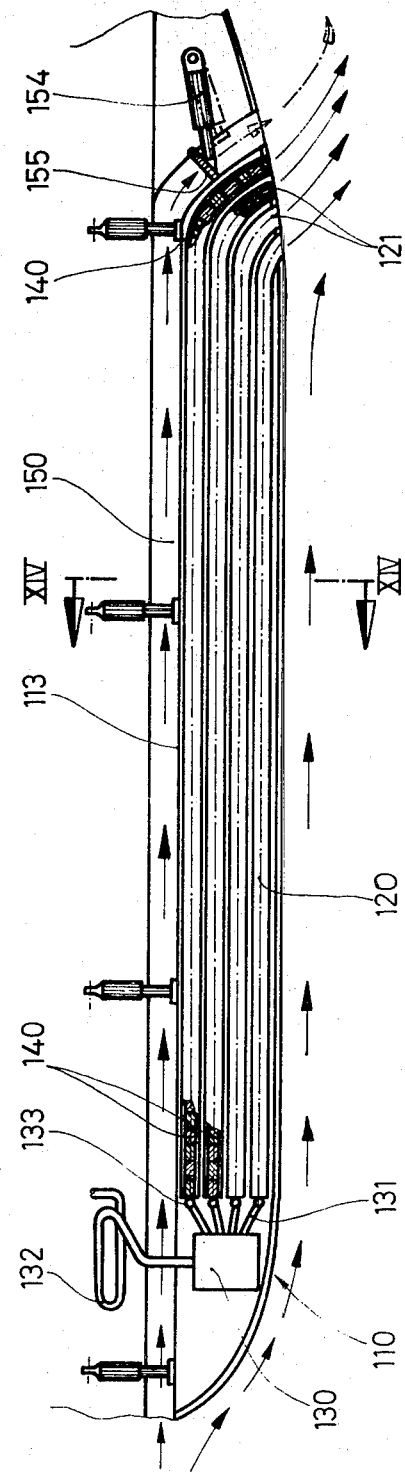

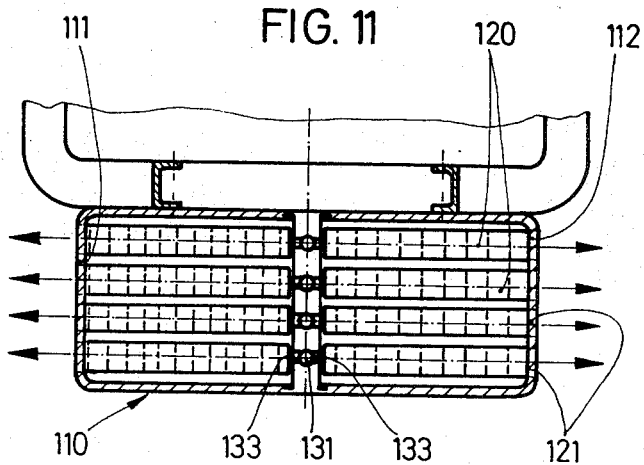
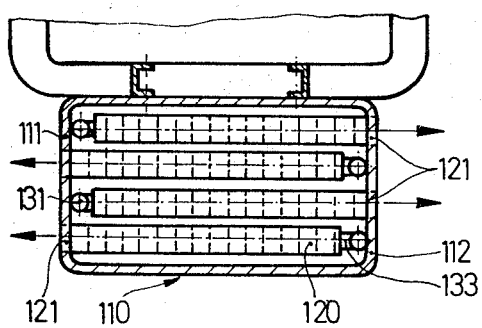
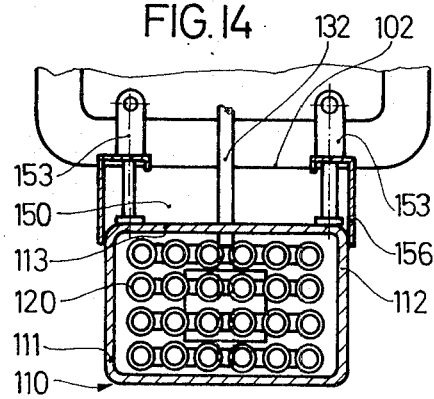
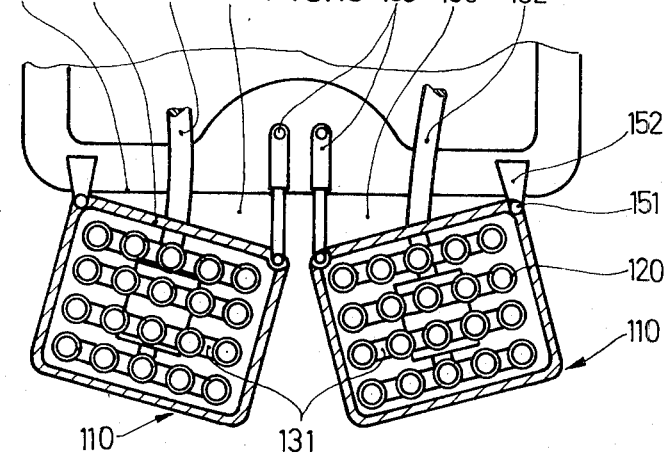

SYSTEM FOR DROPPING STORED MATERIAL FROM TUBULAR CONTAINER MEANS PROVIDED AT AN AIRCRAFT

This invention generally relates to an aircraft having a system for storing material in a container and dropping the stored material therefrom, and more particularly to a system for storing material in tubular compartments within the container and for applying pressure air to the tubular compartments for dropping the stored material from the aircraft.

Presently, it is known to provide a container for storing material in the fuselage at the bottom side of an aircraft. The container has flaps which are opened when the material should be dropped from the aircraft. It is also known to secure the container to the outside of the fuselage or the wings of the aircraft. In this case, the container can be removed when it is not used. This known system for storing and dropping material has the drawback that, after opening the flaps, the quantity and rate of the material to be dropped cannot be controlled, since the material is dropping freely. Moreover, a different device has been known for spraying pressurized fluids from an aircraft. This device comprises a tube having slot-shaped apertures positioned parallelly with respect to the longitudinal axis of the tube. A movable piston is provided inside the tube so as to alter the effective length of the slot-shaped aperture and thereby the quantity of pressurized fluid sprayed through the aperture. Although this device is convenient for controlling the discharge of a pressurized fluid, it cannot be used for a controlled dropping of solid material. Another disadvantage of these known devices is the failure of a control of the direction in which the discharged material drops after the material has left the storing containers.

A main object of this invention is to provide an improved system for storing material in container means at the aircraft and for dropping the stored material therefrom.

A further object is to provide container means which are particularly adaptable to store the material so that it can be discharged in any desired quantity and in different directions from the container means.

Another object is to provide means for controlling the discharge of the stored material from the container means with respect to time and quantity.

A still further object is to provide means for controlling the dropping path of the stored material after it has been discharged from the container means.

A feature of this invention is the provision of a system for storing material in container means at an aircraft and dropping the stored material therefrom. The container means includes tubular compartment means having front and rear orifice means with the rear orifice means being coupled to pressure air generating means for supplying pressure air thereto and pushing the stored material to be dropped from the aircraft through the rear orifice means. The pressure air generating means comprises first control means for controlling the quantity and duration of pressure air supply to the front orifice means and further pressure air output means behind the rear orifice means for discharging an airflow which directs the stored material away from the aircraft after it has been pushed through the rear orifice means.

Another feature of this invention is the provision of pressurizing pipe means coupled to the front orifice means of the tubular compartment means and having throttle flap means and effluent bypass flap means for controlling the pressure air supply to the front orifice means.

A further feature of the invention is the provision of container flap means, tiltably connected to the container means and shiftable from a position covering the rear orifice means to an operation position providing an outlet passage for the stored material with the container flap means supporting the nozzle means so as to discharge an airflow in a transverse direction with respect to the longitudinal axis of the tubular compartment means when the container flap means are in operation position.

A still further feature of this invention is the provision of drag flap means hingedly connected to the container means behind the rear orifice means and being extendible downwardly so as to generate a low pressure area thereabout to further control the free dropping of the stored material.

Still another feature of this invention is the provision of positioning means for moving the container means from a rest position at the aircraft to a position removed from the aircraft providing pressurizing channel means between the aircraft and the container means with the pressurizing channel means having an output orifice positioned behind the rear orifice means for providing an airflow to direct the stored material away from the aircraft when being pushed through the rear orifice means. The pressurizing channel means comprises control means for varying the airflow therethrough.

Yet other features believed characteristic of this invention are set forth in the appended claims. The invention itself, however, as well as other objects and advantages thereof, may best be understood by reference to the following detailed description of illustrative embodiments when read in conjunction with the accompanying drawings, wherein: FIG. 1 is a sectional view of the fuselage of an aircraft taken substantially on lines I-I of FIG. 2 showing a container of the system for storing and dropping material according to the invention.

FIG. 6 is an enlarged sectional view of a fragmentary portion of components of the system for storing and dropping material according to the invention taken substantially on lines I-I of FIG. 2 and showing the rear end portion of the container and means for controlling the dropping path of the discharged material.

FIG. 7 is an enlarged sectional view of other components according to the invention taken substantially on lines I-I of FIG. 2 showing the rear end portion of the container and other means for controlling the dropping path of the discharged material.

FIG. 10 is a fragmentary side elevation of the rear end portion of an aircraft showing other containers of the system according to the invention.

FIG. 11 is a sectional view taken substantially on lines XI-XI of FIG. 10.

FIG. 12 is a sectional view of another embodiment of the invention.

FIG. 13 is a sectional view of a still further embodiment of the invention.

FIG. 14 is a sectional view taken substantially on lines XIV-XIV of FIG. 13.

FIG. 15 is a sectional view of another embodiment of the invention with containers being tiltably secured to the aircraft.

Briefly, in a specific form of the invention, an aircraft is equipped with an elongated container which comprises tubes providing compartments for storing material. The front orifices of the tubular compartments are coupled through pipe lines and control devices to a pressure air generator which supplies pressure air thereto for pushing the stored material to be dropped from the aircraft through the rear orifices of the tubular compartments. Behind the rear orifices the container is provided with a flap which comprises an intermediate portion and forward and rearward end portions with the rearward end portion being hingedly secured to the container and which flap is shiftable from a position covering the rear orifices to an operation position in which an outlet passage for the stored material is provided. In operation position the surface of the container flap facing the rear orifices supports nozzles for discharging an airflow. The nozzles are positioned so as to provide an increasing inclination for the discharged airflow from the intermediate portion towards the forward and rearward end portions and also towards lateral side portions of the container flap when the latter is in operation position. The airflow is discharged through the nozzles in a direction generally transverse with respect to the longitudinal axes of the tubular compartments in order to direct the discharged material away from the aircraft after it has been pushed through the rear orifices of the tubular compartments.

Figure 1:
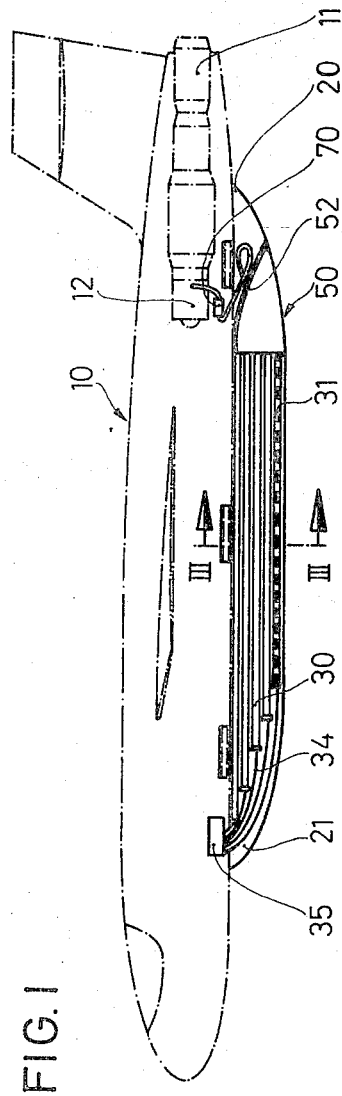
Figure 2:
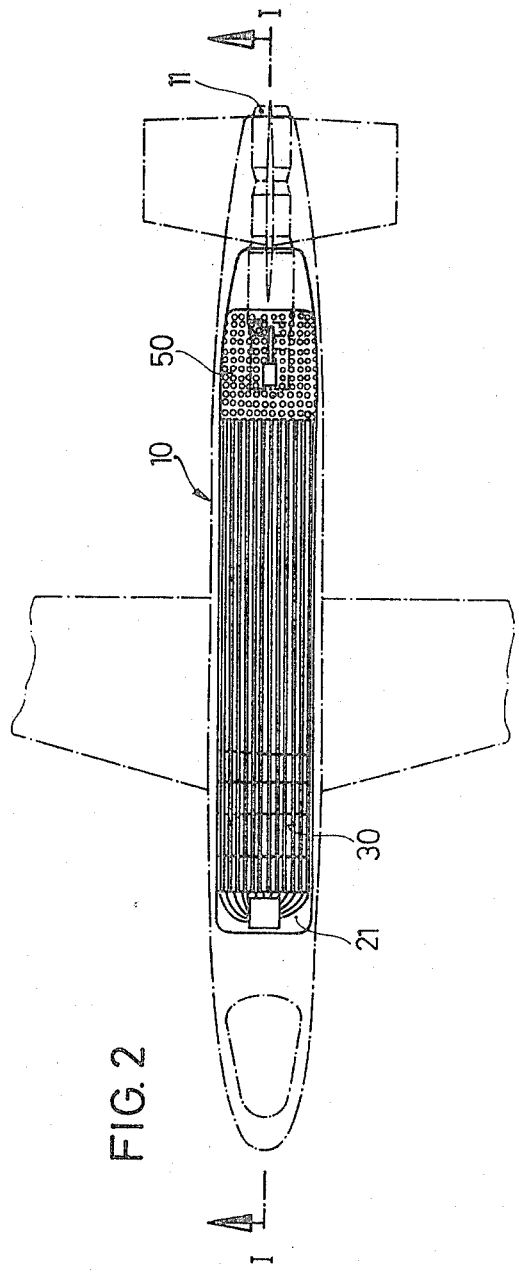
FIG. 2 is a plan view of the fuselage of the aircraft illustrated in FIG. 1.
Figure 3:
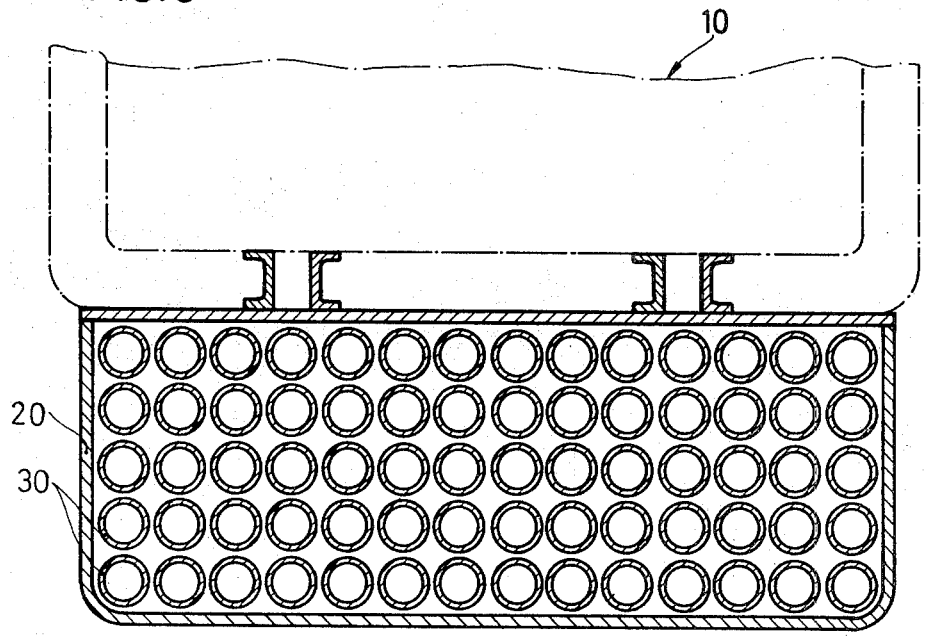
FIG. 3 is a sectional view of the container taken substantially on lines III-III of FIG. 1.
Figure 4:
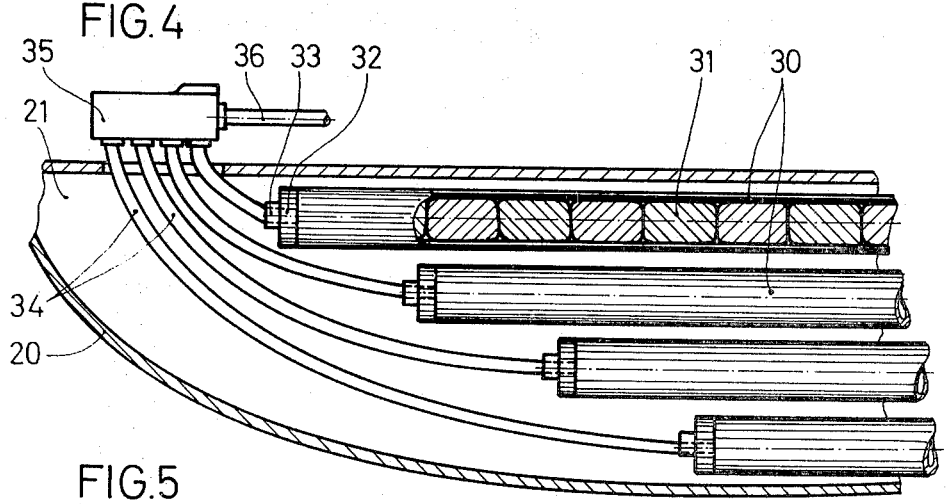
FIG. 4 is an enlarged sectional view of a fragmentary portion of components of the system for storing and dropping material according to the invention taken substantially on lines I-I of FIG. 2.
Figure 5:
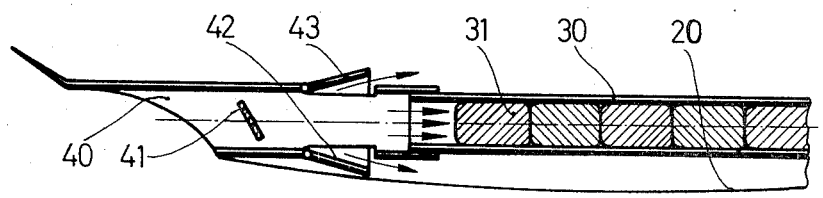
FIG. 5 is an enlarged sectional view of a fragmentary portion of other components according to the invention taken substantially on lines I-I of FIG. 2 showing a pressurizing pipe.
Figure 8:
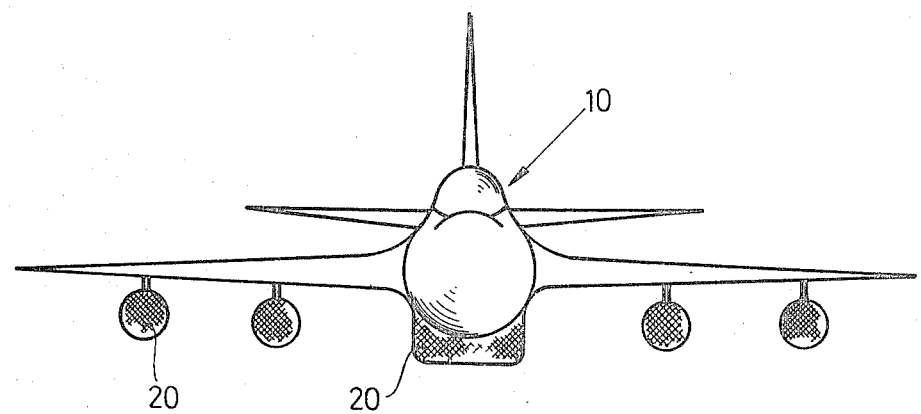
FIG. 8 and 9 are front views of an aircraft showing different containers of the system according to the invention.
Figure 9:
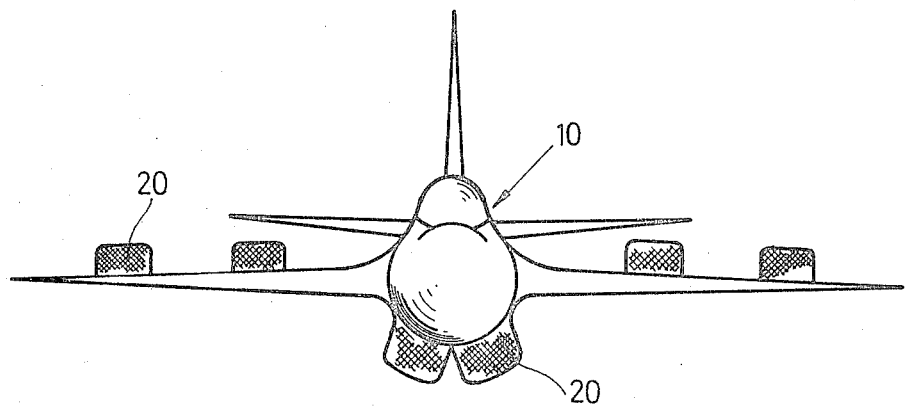

In an alternative form of the invention the container is movably connected to the aircraft so that it can be removed from a rest position at the aircraft to an operation position leaving a channel between the aircraft and the container. This channel is formed so as to provide a pressurizing channel having an intake at the forward end portion and an output orifice at the rearward end portion of the container. The air will be compressed as it is forced into the intake of the pressurizing channel and is discharged through the output orifice for providing an airflow which directs the material away from the aircraft when it is pushed through the rear orifice of the tubular compartments.

Referring now to the drawing, FIGS. 1 and 2 illustrate an aircraft 10 comprising a jet engine 11 which is installed within the fuselage of the aircraft 10. An elongated container 20 is secured to the bottom side of the fuselage and extends over almost the whole length thereof. In the inside space 21 of the container 20 layered rows of tubes 30 are provided filling the whole cross section of the container 20 (FIG. 3). These tubes provide compartments for storing material therein which may consist of solid pieces 31 being stored inside the tubular compartment one behind the other.

As shown in FIG. 4, pressure air is supplied through the front orifice of the tubular compartments 30 in order to push the stored material out of the compartment when it should be dropped. Secured to the front orifice of each single tubular compartment 30 is a valve 33 comprising a cap 32 screwed onto the front orifice end of the tubular compartment. The valves 33 are connected through pressure pipe lines 34 to a pressure air control 35 which, in turn, is coupled by means of a further pressure pipe line 36 to the compressor 12 of the jet engine 11 (not shown). The pressure control 35 comprises means for controlling the quantity and duration of pressure air supply to each single tubular compartment 30 so that the discharge of the stored material through the rear orifice of each single tubular compartment can be controlled with respect to quantity and rate of discharge by means of controlling the pressure air supply to the front orifice.

Referring to FIG. 5, another embodiment of a pressure air generator is illustrated comprising a pressurizing pipe 40 connected with the front orifice portion of a tubular compartment 30. The pressurizing pipe 40 causes the air to be compressed as it is forced into the intake during cruise. The pressurizing pipe 40 comprises a throttle flap 41 and effluent bypass flaps 42 and 43. When the throttle flap 41 is in a position to permit an air flow through the pressurizing pipe the generated pressure air acts on the stored material within the tubular compartment effecting the discharge of the material through the rear orifice thereof. The pressure air supply to the front orifice can further be controlled by opening or closing the effluent bypass flaps 42 and 43 so that part of the pressure air generated bypasses the tubular compartment. It is obvious that also either the throttle flap 41 or the effluent bypass flaps 42 and 43 can be used providing the same result. For controlling the rate of discharge the position of the effluent bypass flaps 42 and 43 can be controlled by a suitable control device (not shown).

Referring now to FIG. 6, the container 20 is shown in a fragmentary view which illustrates a container flap system 50 comprising two cooperating flap elements 52 which are hingedly connected with each other by a joint 51. The container flap is tiltably secured by means of a further joint 53 to the container 20 so that it can be shifted from a position covering the rear orifices of the tubular compartments 30 to an operation position shown in FIG 6 and providing an outlet passage for the material to be dropped. The flap elements 52 are constructed so as to provide a hollow space therein which is connected through a flexible pipe line 60 to a pressure air control 70. The pressure air control, in turn, is connected to the compressor 12 of the jet engine 11 as shown in FIG. 1. The outside surface of the flap elements 52 comprise a plurality of nozzles 54 through which pressure air supplied through the pressure air control 70 and the flexible pipe line 60 to the hollow space of the flap elements is discharged so as to provide an airflow which directs the material away from the aircraft after it is pushed through the rear orifice of the tubular compartments 30. In order to obtain an optimal dropping path for the material and to direct the discharged material away from the aircraft in a predetermined way and in order to prevent a collision with the body of the aircraft, the nozzles are positioned at the flap elements 52 so as to provide an increasing inclination for the discharged airflow from an intermediate portion of the flap elements towards the forward and rearward end portions and also towards the lateral side portions thereof. It is obvious that, by discharging an airflow in a generally transverse direction with respect to the longitudinal axes of the tubular compartments, the stored material pushed through the rear orifice of the tubular compartments can be directed in a predetermined way through the outlet passage of the container when pressure air is supplied to the front orifices.

The flap elements 52 are illustrated in FIG. 6 in their operation position with solid lines, whereas the rest position is shown in phantom lines. It is obvious that by shifting the container flap elements 52 from their operation position to the rest position the elements have to be tilted somewhat about the joint 51. This can be done by means of a hydraulic actuator.

With reference to FIG. 7, a fragmentary portion of the container 20 similar to the portion shown in FIG. 6 is illustrated. In order to provide a determined dropping path for the discharged material, the container 20 comprises a wall 81 which is positioned substantially corresponding to the flap elements 52 in their operation position. The wall 81 has an inner hollow space 82 which is connected to the flexible pipe line 60. The surface of the wall 81 facing the outlet passage comprises nozzles 54 so that the pressure air supplied through the flexible pipe line 60 can be discharged in a substantially transverse direction with respect to the longitudinal axes of the tubular compartments. The outlet passage of the container 20 can be closed by a drag flap 80 which is hingedly secured to the container immediately behind the rear orifice of the tubular compartments 30. In order to provide a low pressure area the drag flap 80 can be tilted downwardly. Thus, a more efficient dropping path for the discharged material is provided due to the low pressure area caused behind the drag flap.

In operation, the pressure air is supplied from the compressor 12 of the jet engine 11 through the pressure air pipe line 36 and the pressure air control 35 (FIG. 4). From the pressure air control 35 the pressure air can be applied through the pipe lines 34 separately to each single tubular compartment 30. Thus, depending on the respective control, the stored material can either be pushed out of each single tubular compartment separately, or out of a plurality of tubular compartments simultaneously. For example, the pressure air can be supplied first to the bottom layer of the tubular compartments and, after the stored material of these compartments has been completely discharged, the pressure air can be supplied to the next following layer and so on. However, it is obvious that the pressure air can also be supplied to all tubular compartments simultaneously. In order to spread the material when it is dropping through the outlet passage, the nozzles 54 can be positioned at the container flap elements 52 or wall 81 with an increasing inclination not only from the intermediate portion towards the forward and rearward end portion, but also towards the lateral portion of the container flap elements.

Referring to FIGS. 8, 9 and 10, an aircraft is illustrated in FIGS. 8 and 9 having containers 20 for storing and dropping material affixed to the bottom side of the fuselage and the wings of the aircraft, whereas FIG. 10 shows a fragmentary portion of an aircraft 100 having a plurality of containers 110 connected to the bottom side of the fuselage with the tubular compartments 120 being positioned therein in a direction substantially transverse to the roll axis of the aircraft. As it is apparent from FIG. 11, the tubular compartments 120 are positioned next to each other in each layer with the front orifice end being placed in the intermediate portion of the container 110 and the rear orifice portion of the tubular compartments ending at apertures 121 in the sidewalls 111 and 112 of the container 110. The front orifice end portions of the tubular compartments are connected through pressure air pipe lines 131 and 133 to a pressure air control 130 which, in turn, is connected through a pressure air pipe line 132 to the compressor of the jet engine 101.

Thus, by positioning all tubular compartments 120 transverse to the roll axis of the aircraft, the system for storing and dropping material according to the invention permits a complete discharge of the stored material within a short period of time which ensures that the material is dropped onto a minimum size area.

As it is further apparent from FIG 11, the container 110 needs a relatively wide dimension, if each layer of tubular compartments comprises two side-by-side rows.

In case the container 110 has to have a small width, the tubular compartments 120 can be layered within the container 110 according to FIG. 12, where the rear orifices of the tubular compartments of the different layers are facing in opposite directions alternately. The pipe lines 131 and 133 originating from the pressure air control 130 are alternately positioned along the inner side walls of the container 110. It is obvious that, by this arrangement of the tubular compartments, a determined minimum length of the tubular compartments can be provided which substantially corresponds to the overall width of the container 110.

Referring now to FIGS. 13 and 14, a container 110 according to the invention is shown provided at the bottom side of an aircraft and comprising elongated tubular compartments 120 which are positioned in parallel to the longitudinal axis of the aircraft. The position of the container 110 with respect to the aircraft can be changed by means of actuator devices 153 secured to the bottom side of the aircraft. Each actuator device comprises a cylinder wherein a piston rod is slidably supported. The free end of each piston rod is rigidly secured to the container 110 so that by actuating the actuator device 153 the container can be moved from a rest position at the aircraft to a position removed from the aircraft.

In this position, a pressurizing channel is provided between the bottom surface 102 of the aircraft and the top surface 113 of the container 110. The output orifice of the pressurizing channel is positioned behind the rear orifices 121 of the tubular compartments so that the air forced into the pressurizing channel during cruise will be compressed when passing the pressurizing channel and being discharged through the output orifice. Thus, an airflow directs the discharged material away from the aircraft when it is pushed through the rear orifices of the tubular compartments. In order to control the pressure air discharged through the output orifice of the pressurizing channel, a control flap 151 is rotatably secured to the wall of the pressurizing channel and can be adjusted by an actuator device 154 to vary the airflow which passes the output orifice of the pressurizing channel. As it is apparent from FIG. 13, the rear end portion of the tubular compartment 120 can be bent downwardly so that the stored material 140 is pushed through the rear orifices in a direction substantially transverse to the flight direction.

As shown in FIG. 14, shutters 156 can be secured to the bottom side of the aircraft providing lateral walls of the pressurizing channel when the container 110 is moved downwardly.

Referring to FIG. 15, two containers 110 are shown which are tiltably secured in parallel to the aircraft. Both the containers comprise joint devices 151 at opposite edges which are mounted to supports 152 secured to the aircraft. The inner edges of the containers 110 are rotatably secured to piston rods of actuator devices 153. By operating the actuator devices 153 the container 110 can be rotated about the joint 151. This feature is of particular advantage for changing the area which should be covered by the discharged material. As shown in the illustrated embodiment, a pressurizing channel 150 can also be provided between the top surfaces 113 of the containers 110 and the bottom surface 102 of the aircraft, in order to provide an air flow discharged behind the rear orifices of the tubular compartment to prevent a collision of the discharged material with the body of the aircraft.

Although preferred embodiments of the invention have been described in detail, it is to be understood that various changes, substitutions and alterations can be made therein without departing from the spirit and the scope of the invention as defined by the following claims.

We claim:

1. In combination with an aircraft including a system for storing and dropping material, container means provided on the aircraft, said container means comprising tubular compartment means for storing the material having front and rear orifice means, pressure air generating means coupled to said front orifice means and adapted to supply pressure air thereto for pushing the stored material to be dropped from the aircraft through said rear orifice means, said pressure air generating means comprising first control means for controlling the quantity and duration of pressure air supply to said front orifice means, nozzle means coupled to said pressure air generating means and positioned behind said rear orifice means for discharging an airflow to direct the stored material away from the aircraft when being pushed through said rear orifice means.

2. A system in accordance with claim 1, wherein said pressure air generating means comprises pressurizing pipe means coupled to said front orifice means and having throttle flap means and effluent bypass flap means for controlling the pressure air supply to said front orifice means.

3. A system in accordance with claim 1 which comprises container flap means tiltably connected to the container means and shiftable from a position covering said rear orifice means to an operation position providing an outlet passage for the stored material, said container flap means supporting said nozzle means so as to discharge said air flow in a transverse direction with respect to the longitudinal axis of said tubular compartment means when said container flap means being in operation position.

4. A system in accordance with claim 1 wherein said container means further include drag flap means hingedly connected thereto and positioned behind said rear orifice mean, said drag flap means being extendible downwardly so as to generate a low pressure area thereabout to further control the free fall of the discharged material.

5. A system in accordance with claim 3 wherein said container flap means comprises an intermediate portion and forward and rearward end portions, said intermediate portion and forward and rearward end portions supporting said nozzle means for positioning same so as to provide an increasing inclination for said discharged airflow from said intermediate portion towards said forward and rearward end portions when said container flap means being in operation position.

6. A system in accordance with claim 5 wherein said container flap means comprises several cooperating elements which are hingedly connected with each other.

7. A system in accordance with claim 1 wherein said pressure air generating means comprises jet engine compressor means having flexible pipe line means connecting said jet engine compressor means to said nozzle means for supplying pressure air thereto.

8. A system in accordance with claim 7 which further comprises second control means coupled to said flexible pipe line means for controlling the quantity and duration of pressure air supply to said nozzle means.

9. In combination with an aircraft including a system for storing and dropping material, container means provided at the bottom side of the aircraft, said container means comprising tubular compartment means for storing the material having front and rear orifice means, pressure air generating means coupled to said front orifice means and adapted to supply pressure air thereto for pushing the stored material to be dropped from the aircraft through said rear orifice means, said pressure air generating means comprising control means for controlling the quantity and duration of pressure air supply to said front orifice means, positioning means for moving said container means from a rest position at the aircraft to a position removed from the aircraft providing pressurizing channel means between the aircraft and said container means, said pressurizing channel means having output orifice means positioned behind said rear orifice means for providing an airflow to direct the stored material away from the aircraft when being pushed through said rear orifice means.

10. A system in accordance with claim 9 wherein said positioning means comprises lateral tilting means and vertical moving means for moving said container means in an operation position for dropping the stored material.

11. A system in accordance with claim 9 wherein said pressurizing channel means comprises control means for varying the airflow therethrough.

12. A system in accordance with claim 9 wherein said tubular compartment means comprises a rear end portion being bent downwardly.

13. A system in accordance with claim 9 wherein said tubular compartment means are positioned generally in parallel to the roll axis of the aircraft.